United States Patent [19]
Garr

[11] Patent Number: 4,727,674
[45] Date of Patent: Mar. 1, 1988

[54] ELECTRONICALLY LIGHTED FISHING LURE

[76] Inventor: Michael Garr, 1 Ziska St., Jericho, N.Y. 11753

[21] Appl. No.: 910,310

[22] Filed: Sep. 22, 1986

Related U.S. Application Data

[63] Continuation of Ser. No. 661,162, Oct. 15, 1984, abandoned.

[51] Int. Cl.$^4$ .............................................. A01K 85/01
[52] U.S. Cl. ..................................... 43/17.6; 43/42.47
[58] Field of Search ............... 43/17.6, 42.53, 42.47; 350/96.18

[56] References Cited

U.S. PATENT DOCUMENTS

| | | | |
|---|---|---|---|
| 4,118,270 | 10/1978 | Pan | 350/96.18 |
| 4,175,348 | 11/1979 | Ray | 43/17.6 |
| 4,227,331 | 10/1980 | Ursrey | 43/17.6 |
| 4,250,651 | 2/1981 | Ramme | 43/17.6 |
| 4,347,684 | 9/1982 | Fima | 43/17.6 |
| 4,426,803 | 1/1984 | Helling | 43/17.6 |
| 4,536,985 | 8/1985 | Caviness | 43/17.6 |

Primary Examiner—Gene P. Crosby
Attorney, Agent, or Firm—Handal & Morofsky

[57] ABSTRACT

This invention provides a lighted fishing lure for use by commercial and sport fisherman in casting or trolling applications. This lure can also be attached to nets and draggers. The light source and its control are comprised of hardy solid state electronic components. The light sources may be multiple and on or extended from the body of the lure. The light source may be contained in the body of the lure and light brought to the surface by fiber optics. A method of manufacturing this lure is also disclosed.

7 Claims, 10 Drawing Figures

U.S. Patent  Mar. 1, 1988  Sheet 1 of 2  4,727,674
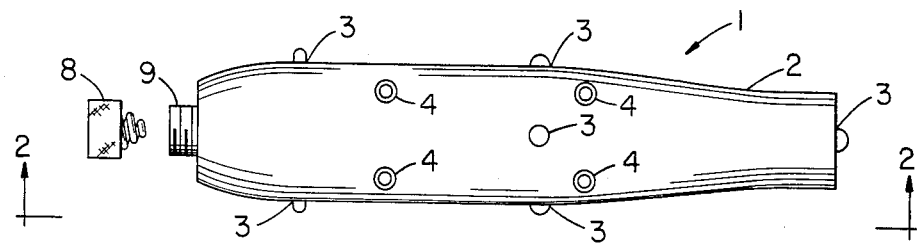
FIGURE 1
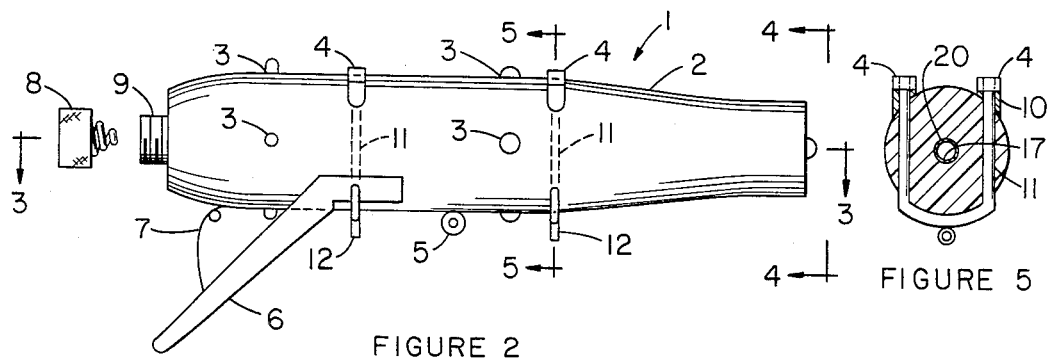
FIGURE 2
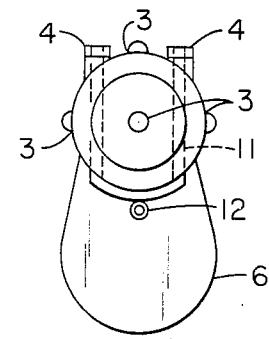
FIGURE 5
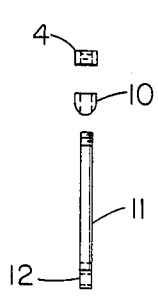
FIGURE 7
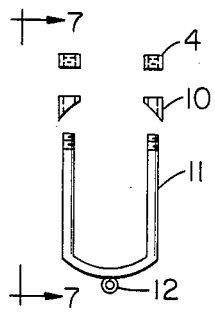
FIGURE 6
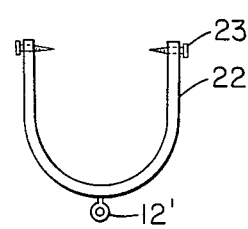
FIGURE 8
FIGURE 4
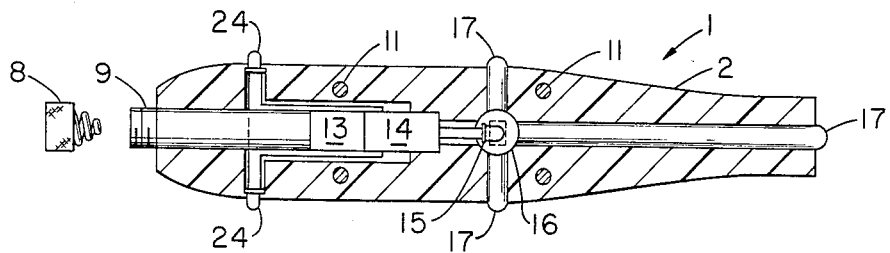
FIGURE 3

ELECTRONICALLY LIGHTED FISHING LURE

This application is a continuation of application Ser. No. 661,162, filed Oct. 15, 1984, now abandoned.

BACKGROUND OF THE INVENTION

This invention relates to an electronically lighted fishing lure of either the plug or jig type which has universal application in that it can be used for casting or trolling on the surface or at depth in either salt or fresh water. In particular, this invention involves the use of solid state electronic devices to provide the light and also uses such solid state devices to both control the light device and to control the energy needed to power these lighted devices. Additionally this invention optionally uses fiber optics (light pipes) to funnel light either for emergence at the surface of the lure or beyond the lure's surface.

Scientists and fishermen both consider that fish are attracted to light because it simulates their natural prey by mimicing the natural luminescence that some fish and fish for exhibit. Therefore, this invention focuses on the fish's sense of sight and more particularly makes use of light as an attractor.

Numerous lures on the market today attempt to use this attractor to advantage by emphasizing metal parts or various luminesent paints. Samme (U.S. Pat. No. 4,250,651) fits a standard incandescent light bulb into a transparent section of his lure. All of these devices including Samme's suffer inherent deficiencies which limit their overall usefulness, life time and general efficiency.

Paints, luminescent and metallic, and polished metal parts depend on an outside light source to activate them. Consequently their use is limited if not precluded on overcast days, in murkey waters, and at depth. In addition, the distance at which their attracting light can be seen by a fish is no more than a few feet at best. The normal light bulb suffers from these deficiencies to a lesser degree but has other serious draw backs. The incandescent light bulb to be used in a fishing lure must be both small and light in weight. It is difficult to manufacture a light bulb of light weight and very robust filament attachment. In fact these small light bulbs are too fragile to withstand much impact. Thus they would have limited life time in use by a sport fisherman and no use for a commercial fisherman. Filaments often detach after a few casts or a few minutes of trolling in a rough sea.

In addition to their lack of impact resistance the ordinary incandescent light bulb has a limited hour life time of continuous use. They gradually burn out and thus are of limited use in a commercial setting where lines may go untended for days at a time.

In contrast, LED's (light emitting diodes) being solid state devices are extremely hardy, showing good impact resistance. In addition they are heat resistant and thus may be exposed to heat sealing resins and compounds to enable them to be put into a water tight seal. They are often rated at twenty thousand hours of useable life and produce a light intensity of two to five millecandela. Special present state of the art LED's can provide three thousand millecandela. This intensity is sufficient to be seen over tens of feet even at depths where surface light can not penetrate. Use of fiber optics (light pipes) concentrates and directs the light. In particular if the ends of these fiber optics are faceted or lenses are used in front of the LED's light can be intensified and controlled to give an effect more attractive to specific species of fish.

Finally these LED's can be energized by compact light weight batteries.

SUMMARY OF THE INVENTION

I have found that LED's (light emitting diodes) under solid state electronic control can provide a lighted fishing lure which is sturdy, long lasting, and which requires little servicing. Thus the lure can be used by either sport or commercial fishermen for casting, trolling at the surface or at depth, or for attachment to fishing nets which are either attended or periodically serviced. Solid state electronic control permits either steady or intermittant light to be emitted. The optional use of fiber optics (light pipes) allows the LED's to be placed internally and the light to be funnelled to the surface of the lure or extended beyond the body of the lure to any desired distance for trolling at depth. The invention includes a replaceable battery which powers the entire assembly. Optionally, if the ends of the fiber optics are faceted or lenses are placed at the, or, in front of surface mounted LED's the sector of the sphere of illumination can be controlled and directed to specific special fishing needs. The LED's, whether they are placed internally with the use of fiber optics or externally on or embedded in the surface of the lure, provide twenty thousand hours of service and a light intensity of two to five millecandela.

BRIEF DESCRIPTION OF THE FIGURES

FIG. 1 is an external dorsal view of the assembled lure 1.

FIG. 2 is an external side view of the assembled lure 1.

FIG. 3 is a cut away view of FIG. 1.

FIG. 4 is an end on rear view of the lure.

FIG. 5 is a posterior cross section of the assembled lure.

FIG. 6 shows the preferred hook/fastner assembly (or "U screw").

FIG. 7 shows a side view of FIG. 6.

FIG. 8 shows another "U screw".

FIG. 10 is a detail of an alternative faceted ended light pipe 17 similar to that of FIG. 3 showing facets 99.

LEGEND OF NUMBER LABELS

Figure 9:
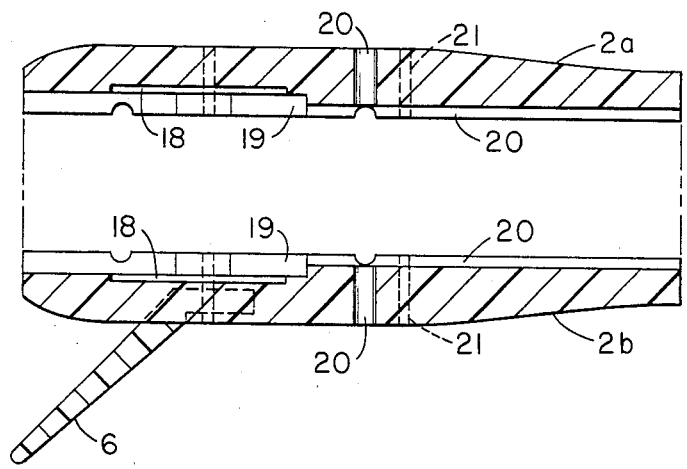
FIG. 9 is a cut away view of FIG. 2.

1. The lure assembly
2. Body of the lure
3. Light emergence points—either LED's or fiber optics (light pipes)
4. Heads of bolts
5. Screw for hook attachment or sinker attachment
6. Optional deflector
7. Line attachment
8. Threaded screw cap
9. Threaded battery holder tube
10, 11. Parts of "U screw"
12, 12'. Incorporated attachments for hooks or for sinkers
13. Battery
14. Control circuit board
15. Internal LED
16. Light chamber associated with internal LED
17. Fiber Optic (light pipe)
18. Compartment for battery 19. Compartment for control circuit board
20. Tube for fiber optic (light pipe) or lead for LED
21. Through holes for "U screw"
22, 23. Parts of the "U screw"
24. External LED

THE INVENTION

This invention employs solid state electronic devices to provide a lighted lure. LED's (light emitting diodes) are used for the light source. These diodes are under the control of a circuit board containing a solid state oscillator or timer to provide steady or intermittent light. Power is derived from a replaceable battery. Lenses may be placed in front of the LED to intensify and direct the light. Fiber optics (light pipes) may also be used to direct the light emitted from the LED and to extend its point of emergence beyond the body of the lure proper. Additionally, the ends of the fiber optic may be faceted. Hooks, sinkers, an optional deflector and a line attachment are added to the body of the lure. This lure can also be attached to nets and draggers.

The circuits which are used to control the LED's are found in standard reference texts. (Modern Electronics Reference Manual, editor John Markus, publisher McGraw-Hill; Popular Circuits Ready Reference, John Markus, Publisher McGraw-Hill; Engineer's Mini-Notebook Series, publisher Tandy Corporation) and in manufacturer's literature. The circuit board is placed into the body of the lure which is water tight.

The LED's are of any color commercially available and are used in a single lure either all of one color or in any combination of colors. Blue is the prefered color for a lure intended to be used at depth. The LED's can be heat sealed into the surface of the lure with their leads threaded through tubes in the body of the lure. These leads are attached to the circuit board. The LED's can be placed internally in the body of the lure. In this embodiment a light chamber is formed in the body of the lure and fiber optics (light pipes) are placed in the tubes leading to the surface of the lure and the light is conducted through the fiber optic to the external environment. The external end of the fiber optic may be faceted as shown in FIG. 10, wherein facets 99 are shown on light pipe 17. A lure may employ all external LED's or all internal LED's with associated fiber optics or any combination of internal and external. The LED's used may contain their own control circuits. These self controlled LED's may have others slaved to them. In this case, the circuit board is used to control the voltage supplied by the battery. Self controlled LED's may be used internally with associated fiber optics or externally. In either case, externally or internally the self controlled LED's may be all self controlled or have some self controlled with others slaved to them.

There are a number of ways standard in the art to attach hooks and sinkers. (Standard Handbook of Fastening and Joining, publisher McGraw-Hill). I prefer to use a "U screw" arrangement with incorporated hook attachment as shown in FIG. 6. The arrangement shown in FIG. 6 with associated barrel or pass bolt also lends support and strength to the entire lure and is a much preferred enbodiment. Separate screws for hook or sinker attachment 5, can be used also.

The battery which energizes the lure is placed in a battery holding tube which is electrically connected to the circuit board. A spring loaded threaded cap holds the battery in contact with the battery holder tube. This cap provides a water tight seal and allows the battery to be replaced when it burns out; thus extending the life of the lure to the life of the LED's.

Either wood or synthetic material is used for the body of the lure, 2. The lure can be made in one piece or is made in two halves which are fitted together as is shown in FIG. 9. FIG. 9 shows the compartment for the battery 18, the compartment for the circuit board 19, tubes for fiber optics 20. When external LED's are used their leads are fed through these tubes 20. FIG. 9 also shows the through holes 21, for the "U screw" FIG. 6 and its associated barrel or pass bolt. Alternatively and not as preferred, the "U screw" shown in FIG. 8 may be used.

When wood is used the cylindrical section is cut in half longitudinally. Then the following are either drilled or routed out: tubes 20, compartments 18, and 19, through holes for the screw and bolt attachments 21. Holes are also prepared at this point for the line attachment 7, for attachment of the optional deflector 6, and for attachment of hooks and sinkers 5. If internal LED's are used the optional light chamber 16, is also drilled or routed out.

If a synthetic material is used all of the above tubes, chambers, compartments and holes can be moulded into the piece. The LED's 24, and 15, are attached to the circuit board 14 and placed into the lure. A threaded battery holder tube 9, is prepared and the battery 13 is placed into it. This assembly of 9 and 13 is placed into the body of the lure making electrical contact with the control circuit board 14. The fiber optics 17 are put in place at this time. All are heat sealed with hot resin to give integral strength, impact resistance and water tightness. The threaded cap 8 is put in place. It is by means of this cap that the battery can be removed and a fresh one inserted. "U screws" 4, 10, and 11 are placed in their through holes 21 and the barrel of pass bolts are fastened. These "U screws" have incorporated into them and attachment for hooks or sinkers 12. The deflector 6 and the line attachment 7 are put in place. The lure may be left bare or is painted with marine or luminous paints and protective coatings.

The assembled lure 1, appears as represented in FIGS. 1 and 2. The spring loaded threaded cap 8 is screwed into place. Light emerges either continuously or intermittently from the ends of optionally faceted fiber optics or external LED's at 3, and the heads 4 of the "U screw" are discernable. There is also the deflector 6, the hook or sinker attachments 5 and 12' and the line attachment 7.

The following examples illustrate certain embodiments of my invention but do not indicate the scope of my invention which is described in the specifications and claims.

EXAMPLE 1

Into the body of the lure three LED's, one red, one green, and one orange are positioned so they supply a source of light at the relative position of each fish eye and at the position of the fish tail. The battery used is a 12 volt cigarette lighter type of "N" type battery and LED's are controlling CMOS 555 mounted on a control circuit board.

EXAMPLE 2

The lure of Example 1 in which CMOS is replaced by a 2N2222 transistor and numerous other resistors and capacitors in a circuit to produce a controlled oscillator on a control circuit board.

EXAMPLE 3

The lure of Example 1 in which the CMOS is replaced with a timer such as 3909 type with appropriate resistors and capacitors mounted on a printed circuit board to produce a controlled timing of on/off light.

EXAMPLE 4

The lure of Example 1 in which the control circuit board contains various resistors and capacitors to control voltage. One LED is chosen from the following list of Telefunken Type LED's: V621P, V622P, V623P, CQX21. These Telefunken Type LED's contain an electronic chip programmed to blink on and off and which drive the other LED's.

EXAMPLE 5

The lure of Example 1 in which the LED's are attached to the control circuit board and their light is fed to five acrylic light pipes positioned in such a way that light is fed in four 90° quadrants from the mid body of the lure and one acrylic light pipe or fiber optic extended out the end of the lure.

EXAMPLE 6

The lure of Example 5 in which the ends of the light pipes or fiber optics are faceted.

EXAMPLE 7

The lure of Example 2 in which the LED's are attached to the control circuit board and their light is fed to five acrylic light pipes or fiber optics positioned in such a way that the light is fed in four 90° quadrants from the mid body of the lure and one acrylic light pipe or fiber optic extended out the end of the lure.

EXAMPLE 8

The lure of Example 7 in which the ends of the light pipe or fiber optic are faceted.

EXAMPLE 9

The lure of Example 3 in which the LED's are attached to the control circuit board and their light is fed to five acrylic light pipes or fiber optics positioned in such a way that the light is fed to four 90° quadrants from the mid body of the lure and one acrylic light pipe or fiber optic extending out the end of the lure.

EXAMPLE 10

The lure of Example 9 in which the ends of the light pipes or fiber optics are faceted.

EXAMPLE 11

The lure of Example 4 in which the LED's are attached to the control circuit board and their light is fed to five acrylic light pipes or fiber optics positioned in such a way that the light is fed to four 90° quadrants from the mid body of the lure and one acrylic light pipe or fiber optic extending out the end of the lure.

EXAMPLE 12

The lure of Example 11 in which the ends of the light pipes or fiber optics are faceted.

EXAMPLE 13

The lure of Example 5 in which the LED's are blue and the pipes or fiber optics extend 20 feet beyond the body proper and the ends of the light pipes are faceted and held onto wood or synthetic bodies with hooks attached to it.

EXAMPLE 14

The lure of Example 13 in which the CMOS is replaced by a transistorized oscillating circuit.

EXAMPLE 15

The lure of Example 13 in which the transistorized oscillating circuit is replaced with 3909 timers.

EXAMPLE 16

The lure of Examples 4, 11 and 12 in which the Telefunken LED is replaced with the Telefunken Type V628P bi-colored blinking LED.

EXAMPLE 17

All the lure of the preceeding examples are fitted with varied weight sinkers.

EXAMPLE 18

The lures of the preceeding examples are coated with coatings containing luminescent pigments and metallic colored flakes and overcoated with a two part catalytic cured polyeurethane coating.

I claim:

1. A lighted fishing lure, comprising:
   (a) a lure body defining a lure cavity having an orifice communicating with the space outside said lure body;
   (b) a cap for closing said orifice;
   (c) engaging means adapted to mate with said cap, said engagement means being secured around said orifice to permit said orifice to be closed by said cap;
   (d) a battery configured and dimensioned to pass through said orifice;
   (e) circuit means adapted to receive said battery and provide an electrical signal in response thereto;
   (f) a solid state light emitting device connected to receive said electrical signal; and
   (g) a large diameter homogeneous unitary fiber-optic member having a diameter at least of the same order of magnitude as said solid state light emitting device, said member being optically coupled to said solid state light emitting device and extending between said solid state device and the outside surface of said lure body and terminating with a plurality of facets oriented at different angles at the outside surface of said lure body, whereby the facets allow transmission of light over a wide range of different directions to attract fish in various positions about the lure.

2. A fishing lure as in claim 1 wherein said electrical signal is a pulsating electrical signal.

3. A fishing lure as in claim 2 wherein there are a plurality of fiber-optic members bearing faceted ends driven by a plurality of solid state devices which are in turn driven by said circuit means.

4. A fishing lure as in claim 1 further comprising a deflector for achieving irregular movement of said lure, said deflector being secured to the outside surface of said lure.

5. A fishing lure as in claim 4 wherein said deflector is secured adjacent to a forward end of the lure body.

6. A fishing lure as in claim 4 further comprising support eye means for securing a line and hooks.

7. A lighted fishing lure, comprising:

(a) a lure body defining a closed lure cavity;
(b) circuit means for providing an electrical signal;
(c) power supply means for powering said circuit means;
(d) a solid state light emitting device connected to receive said electrical signal; and
(e) a large diameter unitary homogeneous fiber-optic member having a diameter of the same order of magnitude as said solid state light emitting device, said member being optically coupled to said solid state light emitting device and extending between said solid state device and the outside surface of said lure body and terminating with a plurality of facets oriented at different angles at the outside surface of said lure body whereby the facets allow transmission of light over a wide range of different directions to attract fish in various positions about the lure.

* * * * *